United States Patent
Grabka et al.

(10) Patent No.: US 9,552,213 B2
(45) Date of Patent: Jan. 24, 2017

(54) SYSTEMS AND METHODS FOR FACILITATING SOFTWARE INTERFACE LOCALIZATION BETWEEN MULTIPLE LANGUAGES

(75) Inventors: Dariusz Grabka, Kitchener (CA); Ali Ghassemi, Waterloo (CA)

(73) Assignee: D2L Corporation, Kitchener, Ontario (CA)

( * ) Notice: Subject to any disclaimer, the term of this patent is extended or adjusted under 35 U.S.C. 154(b) by 1055 days.

(21) Appl. No.: 13/108,587

(22) Filed: May 16, 2011

(65) Prior Publication Data
US 2012/0296630 A1 Nov. 22, 2012

(51) Int. Cl.
*G06F 17/28* (2006.01)
*G06F 9/44* (2006.01)
*G06F 17/22* (2006.01)
*G06F 17/27* (2006.01)
*G06F 3/00* (2006.01)
*G06F 17/20* (2006.01)
*G06F 3/048* (2013.01)
*G10L 13/00* (2006.01)

(52) U.S. Cl.
CPC ......... *G06F 9/4448* (2013.01); *G06F 17/2223* (2013.01)

(58) Field of Classification Search
USPC ... 704/2, 3, 8, 260, 5, 9; 715/262, 703, 764, 715/816; 434/178; 382/182; 719/328; 717/141; 726/26; 705/3; 707/100; 345/168
See application file for complete search history.

(56) References Cited

U.S. PATENT DOCUMENTS

| | | | | |
|---|---|---|---|---|
| 5,535,119 A | * | 7/1996 | Ito et al. | 704/3 |
| 6,460,015 B1 | * | 10/2002 | Hetherington | G06F 17/2223 345/467 |
| 6,490,563 B2 | * | 12/2002 | Hon et al. | 704/260 |
| 6,507,812 B1 | * | 1/2003 | Meade | G06F 9/4448 704/8 |

(Continued)

OTHER PUBLICATIONS

Wikipedia, Pseudolocalization, Sep. 14, 2010, available online at: http://en.wikipedia.org/w/index.php?title=Pseudolocalization&oldid=384714437.

(Continued)

*Primary Examiner* — Pierre-Louis Desir
*Assistant Examiner* — Neeraj Sharma
(74) *Attorney, Agent, or Firm* — Bereskin & Parr LLP

(57) ABSTRACT

In one aspect, there is provided a system having a processor and a data storage device coupled to the processor. The data storage device stores instructions executable by the processor to receive a software module, the software module having an interface adapted to display a plurality of first graphemes in a first language, provide at least one look-up table having at least some of the first graphemes and a plurality of second graphemes in a second language associated therewith, said association being based on a phonetic similarly between the first and second graphemes when the first graphemes are vocalized in the first language and the second graphemes are vocalized in the second language, and replace at least one of the first graphemes in the interface with the associated second graphemes such that the interface is adapted to display the second graphemes in the second language, the second graphemes being understandable in the first language when the second graphemes are vocalized.

21 Claims, 6 Drawing Sheets

(56) References Cited

U.S. PATENT DOCUMENTS

| | | | |
|---|---|---|---|
| 7,353,165 B2* | 4/2008 | Zhou | G06F 17/2827 704/2 |
| 7,424,675 B2* | 9/2008 | Lee et al. | 715/262 |
| 8,782,556 B2* | 7/2014 | Badger | G06F 3/0237 715/816 |
| 2003/0074185 A1* | 4/2003 | Kang | 704/2 |
| 2005/0197838 A1* | 9/2005 | Lin et al. | 704/260 |
| 2005/0240943 A1* | 10/2005 | Smith | G06F 9/465 719/328 |
| 2006/0130026 A1* | 6/2006 | McHugh | G06F 17/212 717/141 |
| 2007/0101281 A1* | 5/2007 | Simpson | G06F 17/24 715/764 |
| 2008/0008386 A1* | 1/2008 | Anisimovich et al. | 382/182 |
| 2008/0206724 A1* | 8/2008 | Volden | 434/178 |
| 2008/0222734 A1* | 9/2008 | Redlich | G06F 21/577 726/26 |
| 2009/0187425 A1* | 7/2009 | Thompson | G06F 19/3443 705/3 |
| 2009/0299726 A1* | 12/2009 | Canu | G06F 9/4448 704/3 |
| 2010/0211377 A1* | 8/2010 | Aoyama et al. | 704/8 |
| 2010/0299133 A1* | 11/2010 | Kopparapu et al. | 704/2 |
| 2011/0126098 A1* | 5/2011 | Jellison, Jr. | G06F 9/4448 715/703 |
| 2011/0184723 A1* | 7/2011 | Huang | G06F 17/2705 704/8 |
| 2012/0035910 A1* | 2/2012 | Awaida | G06F 17/214 704/5 |
| 2014/0354549 A1* | 12/2014 | Huang | G06F 3/04886 345/168 |
| 2015/0088486 A1* | 3/2015 | Barrett | G06F 17/289 704/3 |
| 2016/0019201 A1* | 1/2016 | Qian | G06F 3/018 704/9 |

OTHER PUBLICATIONS

MSDN Library, Visual Studio—Localizability Testing, Nov. 26, 2010, available online at: http://web.archive.org/web/20101126080406/http://msdn.microsoft.com/en-us/library/aa292136%28VS.71%29.aspx.

* cited by examiner

SYSTEMS AND METHODS FOR FACILITATING SOFTWARE INTERFACE LOCALIZATION BETWEEN MULTIPLE LANGUAGES

TECHNICAL FIELD

The embodiments herein relate to systems and methods for facilitating software interface localization, and in particular to systems and methods for facilitating software interface localization between multiple languages.

INTRODUCTION

Software and other applications that are developed originally for one language are often distributed into one or more other languages. As such, the user interfaces for software often require modifications or adaptations. In particular, the user interfaces may be localized to communicate information in one or more languages associated with countries where the software is sold or used.

For example, in some cases the user interface may initially have been developed in a first language, such as English. Then, prior to distributing the software in another country (e.g. China, Egypt, Israel etc.) where other languages are predominant, the user interface may be translated to display and communicates information in those predominant or major local languages (e.g. Chinese, Arabic, Hebrew).

Unfortunately, when a user interface is translated, issues may develop in the functionality of the interface. For example, differences in the structure of the translated languages may lead to errors or compatibility problems in the ways that information is displayed or processed. To address these concerns, the user interface may undergo localization testing to ensure that the user interface operates as intended after translation. However, localization testing can be challenging, time consuming and expensive.

SUMMARY OF SOME EMBODIMENTS

According to one aspect there is provided a method for facilitating software interface localization including the steps of receiving a software module, wherein the software module has an interface adapted to display a plurality of first graphemes in a first language. The method also includes providing at least one look-up table having at least some of the first graphemes and a plurality of second graphemes in a second language associated therewith, said association being based on a phonetic similarly between the first and second graphemes when the first graphemes are vocalized in the first language and the second graphemes are vocalized in the second language. The method also includes replacing at least one of the first graphemes in the interface with at least one of the associated second graphemes such that the interface displays the second graphemes in the second language. The second graphemes are selected on the basis of being audibly understandable in the first language when the second graphemes are vocalized.

According to another aspect, there is provided a method for facilitating software interface localization. The method includes the steps of receiving a software module having an interface adapted to display a plurality of first graphemes in a first language, determining at least one first language phonetic element associated with at least one of the first graphemes, wherein each phonetic element is a sound associated with the pronunciation of the at least one first grapheme, determining at least one second language phonetic element that is phonetically similar to the first language phonetic element, determining at least one second grapheme in a second language associated with the second language phonetic element, and replacing the at least one first grapheme of the interface with the at least one second grapheme.

According to yet another aspect, there is provided a system having a processor and a data storage device coupled to the processor. The data storage device stores instructions executable by the processor to receive a software module, the software module defining an interface adapted to display a plurality of first graphemes in a first language, provide at least one look-up table having at least some of the first graphemes and a plurality of second graphemes in a second language associated therewith, said association being based on a phonetic similarly between the first and second graphemes when the first graphemes are vocalized in the first language and the second graphemes are vocalized in the second language, and replace the first graphemes in the interface with the associated second graphemes such that the interface is adapted to display the second graphemes in the second language, the second graphemes being understandable in the first language when the second graphemes are vocalized.

BRIEF DESCRIPTION OF THE DRAWINGS

The drawings included herewith are for illustrating various examples of systems, methods and apparatus of the present specification and are not intended to limit the scope of what is taught in any way. In the drawings.

DETAILED DESCRIPTION

Figure 1:
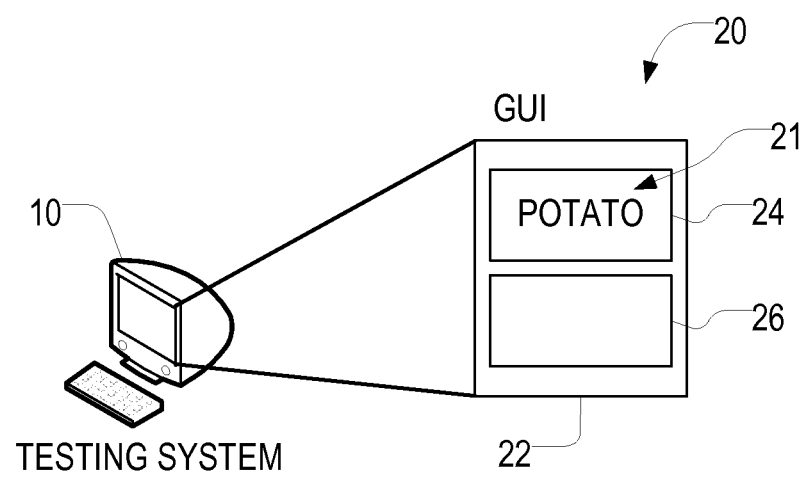
FIG. 1 is a schematic diagram of a testing system for facilitating software interface localization according to some embodiments.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

In some cases, the embodiments of the systems and methods described herein may be implemented in hardware or software, or some combination of both hardware and software. In some cases, these embodiments may be implemented in computer programs executing on programmable computing devices, each comprising at least one processor, a data storage device (including volatile and non-volatile memory and/or storage elements), at least one input device, and at least one output device.

In some cases, each program may be implemented in a high level procedural or object oriented programming and/or scripting language to communicate with a computer system. However, in other cases the programs can be implemented in assembly or machine language, if desired. In some cases, the language may be a compiled or interpreted language.

The systems and methods as described herein may also be considered to be implemented as a non-transitory computer-readable storage medium, configured with a computer program, wherein the storage medium so configured causes a computer to operate in a specific and particular manner to perform at least some of the functions described herein.

Embodiments as generally described herein relate to systems and methods for facilitating localization of software or other applications. The term "localization" generally refers to developing, testing and/or adapting software for release into one or more particular markets, which may include a market with a predominant or major language that is different from the language of the market for which the software was initially developed.

Generally, the localization process may include translating a user interface (e.g. text elements, button and control labels, etc.) into a localized language, testing the user interface to determine whether the local language elements of that localized language are being displayed correctly, and adapting the user interface to receive input in that local language.

The localization process tends to reduce possible issues or errors that may arise from translating the user interface of the software into another language. For example, a guided user interface (GUI) for software may tend not display some languages correctly when developed in a first language (e.g. English). In particular, the graphemes (e.g. visual language symbols) associated with a particular translated language may be cutoff or overrun the borders of one or more GUI objects, such as a text box or a menu item, after translation.

Furthermore, some software applications may not be programmed to handle characters that are not within a standard (e.g. ASCII or Unicode, etc.) set of characters. In such cases, the implementation and use of non-standard characters (e.g. characters/graphemes from another language) may cause instability in the software. More specifically, the software may not be able to handle user input in these unexpected or unusual character formats, which may cause the software to malfunction or experience errors.

Some software applications may also struggle with languages that are read and written in directions other than from left-to-right (which is the direction common to most western languages, such as French and English). For example, characters from certain languages (Arabic, Hebrew, Farsi, etc.) are normally read and written from right-to-left. Similarly, other languages may be processed in a column-by-column fashion, from the top-to-bottom or bottom-to-top. In such cases, the software may struggle to display a user interface correctly.

Significant development and/or testing resources are often expended to address localization issues. This can be quite costly, particularly since such resources may need to be expended for each particular language in each localization implementation, and each time a change is made.

For instance, one way to test for localization issues is to have the user interface translated. In some cases, this may include a translator manually translating the software interface into one or more particular languages. However, manual translation can be time consuming and the associated costs are often high due to the required expertise of the translator, particularly for unusual or uncommon languages. Moreover, since the software is often translated at an early stage of the development process, the user interface may be subject to major changes as the development continues. Such changes may require further manual translations, which can lead to delays and increased costs.

In some cases, it may be also possible to translate a user interface using automated translation software, such as translation tools provide by Google Inc. or using other machine based translation tools. However, the accuracy of translated text generated by translation software may be limited, particularly in a user interface. For example, translation software often requires a context (e.g. words or sentences surrounding the particular word to be translated) in order to determine a suitable translation, and such use contexts may not be readily available in the software interface environment.

For example, terms such as "format", "window", or "table" in a user interface element (e.g. a menu bar for a word processor application) often have context specific meanings that may not be readily understood by automated translation software. As such, using automated translation software for localization testing may result in a user interface that is confusing due to the poor quality of the translated text. As developers work with the interface during the localization process, having such an incomprehensible interface is undesirable.

One technique to address the localization issue is to use pseudolocalization, which may be particularly useful at an early stage of the software development process. In particular, pseudolocalization operates by replacing the written text to be localized with "pseudolocalized" written text. For example, the pseudolocalized written text may include replacing ASCII characters with non-ASCII characters, in some cases padded with additional characters to simulate longer character sets when the text is localized into another language.

To retain readability for the developers, the non-ASCII characters are often selected and arranged to be visually similar to the ASCII characters in the original text. For example, the phrase "Edit Program Settings" in a first language (e.g. English) and displayed using ASCII characters may be replaced with the text "[YxĤ8z*jQ ^dĦbÚk&d == ɛÐiṯ_Þr 0ģЯäm sǝTтıИğ§ ]", which includes non-ASCII characters that are visually similar to the English phrase.

This type of substitution generally permits a tester performing localization testing on the software to visually inspect the pseudolocalized written text and understand the meaning thereof (at least at a very basic level), without requiring an actual translation of the text to be performed.

However, the applicability of pseudolocalization testing may be limited in some situations. For example, visually similar characters may not be available for some particular languages (e.g. it may be difficult to locate Arabic written characters that have a similar look to English characters). Pseudolocalization testing may also fail when testing the layout, font, or text directionality, which may be strictly related to the language. Moreover, some user agents, such as web browsers, may treat specific character sets (e.g. Arabic characters) differently than characters from other character sets (e.g. Unicode characters), leading to further testing problems.

At least some of the embodiments described herein relate to systems and methods for localization testing that attempt to overcome at least some of the disadvantages described above.

Referring now to FIG. 1, illustrated therein is a schematic of a test system 10 adapted to display a software module having an interface 20. As shown, the interface 20 is adapted to display first graphemes 21 (e.g. visual symbols) in a first language (e.g. English).

Generally, to test whether the interface 20 will correctly display a second language (e.g. French, Farsi, Hebrew, etc.), elements of the interface 20 may be translated into the second language.

Traditionally, translating a first word from one language into a second language involves looking for a second word in the second language that has the same (or a similar) meaning as the first word. For example, the word "CAR" in English might be translated into "VOITURE" in French, which has an analogous meaning.

However, in the embodiments as described herein, the second word in the second language is selected without regard to similarities in the actual meaning of the first and second words. Rather, the second "word" is generated based on phonetic similarities between language elements of the first and second words as further described below.

In particular, the system 10 facilitates testing of the compatibility of the interface 20 in the second language by replacing first graphemes (e.g. first visual symbols) associated with the first language (e.g. English) with second graphemes associated with the second language (e.g. French). Moreover, the second graphemes are selected so as to be phonetically similar (e.g. have a similar sound) as the first graphemes.

In some embodiments, the second graphemes may have a completely different meaning from the first graphemes, and in fact will often have no actual meaning (in that they may be combinations of characters that do not form an actual work in the second language but may in fact be completely gibberish in the second language). However, as the second graphemes are selected to be phonetically similar to the first graphemes, it may be possible for a developer or a tester to understand the second graphemes by vocalizing the second graphemes (e.g. speaking or pronouncing the second graphemes to generate the sounds associated therewith). As such, a tester will then be able to understand the meaning of the second graphemes in the first language even though the information displayed on the interface 20 is in the second language and may have a completely different meaning (or in fact no real meaning whatsoever).

As shown, the interface 20 is a guided user interface ("GUI") 22 and includes an output portion 24 that displays first graphemes in a first language, which in this embodiment is a language with Latin-based alphabet. For instance, as shown the output portion 24 displays the text "POTATO" in English.

The interface 20 also generally has an input portion 26 for receiving input, which could be a text box or another control element.

In some embodiments, the interface 20 may be a text-based user interface, or any other type of interface adapted for displaying graphemes of another language. In other embodiments, the GUI 22 could have any combination of interface elements that communicate in a first language grapheme. For example, the GUI 22 may include text boxes, text input areas of various sizes, menu items, menu bars, drop down menus, text display areas, buttons, and so on.

The graphemes are visual characters or other types of symbols of the written language. For example, the graphemes may be Latin-based characters for languages derived from Latin, or non-Latin based characters for languages with other historical roots, such as Chinese, Arabic, Korean, Hebrew, Hindi, Kanji, etc., ideographs in other languages and so on.

In some embodiments, the graphemes may be interpreted left-to-right (e.g. as in English), right-to-left (e.g. as in Arabic), or on a column-by-column basis (e.g. as in some forms of Chinese).

Figure 2:
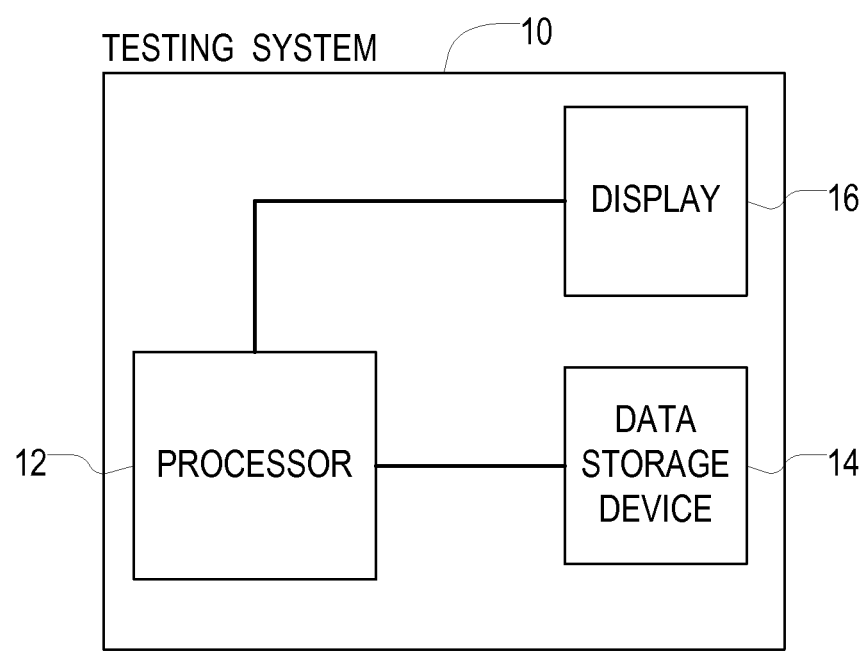
FIG. 2 is a block diagram of exemplary components of the testing system shown in FIG. 1.

Referring now to FIG. 2, illustrated therein are exemplary hardware components of the testing system 10. Generally, the testing system 10 may include a processor 12 in data communication with a data storage device 14 and a display 16. The components of the testing system 10 may differ in other embodiments. In some embodiments, the processor 12, may be a hardware-processing device such as desktop or laptop Core™ processor provided by Intel Corporation, a processor developed for mobile computing (e.g. an Atom processor), or other types of hardware-processing devices.

The processor 12 may be adapted to facilitate software interface localization by phonetically translating the received software module having the interface 20, as described with reference to FIGS. 3 and 4 herein below. In some embodiments, the processor 12 may be adapted to perform one or more steps of the methods 150 and 170 for facilitating software interface localization as described below.

Generally, the processor 12 is adapted to determine at least one first language phonetic element associated with at least one of the first graphemes. The phonetic element includes one or more sounds associated with the at least one first grapheme when that first grapheme is vocalized (e.g. spoken).

In some embodiments, the phonetic element could be a phoneme and/or a syllable. In the example as shown, the phonetic elements includes a first language phonetic element "A", generally indicated by reference numeral 32, which is associated with a sound when the text "PO" is vocalized. Similarly, a second phonetic element "B", generally indicated by reference numeral 34, is associated with a sound when the text "TA" is vocalized, and a third phonetic element "C", generally indicated by reference numeral 36, is associated with a sound when the text "TO" is vocalized.

In some embodiments, the phonetic elements 32, 34, and 36 may be stored in the data storage device 14, for example, as one or more waveform representations of the sound associated with each phonetic element 32, 34, and 36, as International Phonetic Alphabets (IPA) elements, or in any other suitable format.

The processor 12 is also adapted to determine at least one second language phonetic element 38, 40, 42 that is phonetically similar to each of the first language phonetic elements. In the example as shown, the first phonetic element 32 is associated with the second language phonetic element "$A_2$", generally indicated by reference numeral 38, the second phonetic element 34 is associated with the second language phonetic element "$B_2$", generally indicated by reference numeral 40, and the third phonetic element 32 is associated with the second language phonetic element "$C_2$", generally indicated by reference numeral 38.

In many cases, there may not be exact phonetic match between graphemes of various languages. In such cases, the first language phonetic elements 32, 34, 36 and the second language phonetic elements 38, 40, 42 that are deemed to be similar may be selected on the basis of some particular degree of similarity (e.g. greater than 75% audible similarity, greater than 90% audible similarity, etc.) that may be less than an exact match. That is, in some embodiments the first phonetic elements 32, 34, 36 and second phonetic elements 38, 40, 42 need not sound identical.

Generally, in some embodiments a second language phonetic element (e.g. 38) may be selected if it sounds sufficiently similar to a first phonetic element (e.g. 32) such that the second language phonetic element is comprehensible in the first language. For example, if the first phonetic element sounds like "cat", it may be sufficient for the second phonetic element to sound like "kaat" to be selected, even though the sounds may not be identical.

In some embodiments, the phonetic similarity between the first phonetic elements 32, 34, 36 and second phonetic elements 38, 40, 42 may be determined based on the properties of the sound waves associated the phonetic elements. For example, the processor 12 may adapted to determine whether two sounds are phonetically similar by analyzing the properties of the sound waves associated with each of the sounds on the basis of some measured statistical values.

In other embodiments, the processor 12 may determine phonetic similarity based on the IPA representation of the phonetic elements 32, 34, 36, 38, 40, 42. For example, first phonetic elements 32, 34 and 36 may be mapped onto IPA representations of their sounds, and these IPA representations may subsequently be used to select the second phonetic elements 38, 40 and 42 in the second language.

In some embodiments, the processor 12 is adapted so that, after determining the second language phonetic elements 38, 40, 42 that are phonetically similar to the first language phonetic elements 32, 34, 36, the processor 12 determines at least one second grapheme(s) in the second language associated with the second language phonetic element 38, 40, 42.

As shown, the second graphemes "!@#" in a fictional second language, as indicated by reference numeral 46, are the graphemes associated with the second language phonetic element "$A_2$". Similarly, the second graphemes "$%^" indicated by reference numeral 48 are associated with the second language phonetic element "$B_2$", and the second graphemes "#&", indicated by reference numeral 50 are associated with the second language phonetic element "$C_2$".

The processor 12 is also adapted so that, after determining the second graphemes 46, 48, 50 associated with the second language phonetic elements 38, 40, 42, the processor 12 replaces the first graphemes 21 of the interface 20 with the second graphemes 46, 48, 50 such that the interface 20 now displays the second graphemes 46, 48, 50 grouped as a "word" (indicated generally as 52). In the example as shown, the second graphemes 52, namely "!@O$%^#&", replace the first graphemes 21 (which showed the word POTATO in English).

By replacing the first graphemes 21 with the second graphemes 52, it may be possible for a tester to determine whether the interface 20 is correctly displaying the second graphemes 52. For example, it may be possible to determine whether the second graphemes 52 are cropped, extend pass the borders of a given text box or other control, wrap correctly to the next line, and so on.

Additionally, the second graphemes 52 are audibly comprehensible in the first language when the second graphemes 52 are vocalized, since the second graphemes 52 sounds similar to the first graphemes 21. In particular, in some embodiments the tester may be at least somewhat familiar with the second language such that he or she is able to vocalize the second graphemes 52 and comprehend the meaning associated therewith in the first language.

In some embodiments, the processor 12 may be adapted to use a text to speech system to vocalize the second graphemes 52. In such embodiments, the tester/developer need not be able to read or vocalize the second graphemes 52 to be able to understand the meaning associated therewith. For example, the testing system 10 could be adapted to vocalize the second graphemes 52 (e.g. when the second graphemes 52 are being highlighted by an input device, such as a mouse pointer); the tester will be able to listen to this vocalization and understand the meaning thereof even if the tester cannot read the written characters of the second graphemes 52.

Providing second graphemes 52 that are audibly comprehensible in the first language facilitates localization testing and development of the interface 20. In particular, it may be advantageous for the testers/developers to be able to understand and navigate the interface 20 when displaying the second graphemes 52, even though the testers/developed may not be able to read, vocalize, or actually have understanding of the second language.

In some embodiments, one or more look-up tables (as described herein) may be provided and used as a referenced to determine which second graphemes in the second language are phonetically similar to the first graphemes. In some cases, the look-up table may be automatically generated (e.g. by the system 10). In other cases, the look-up tables may be manually generated.

In some embodiments, the translation from the first graphemes to second graphemes may be implemented automatically using look-up tables and generally without any user input (or at least with generally little user input). This may offer at least some cost/resource savings as compared to use a translator. Moreover, this approach may be particularly helpful when accommodating and reacting to changes that occur during the development process of the software, and eliminate the need to engage a translator each time a change is made.

Figure 3:
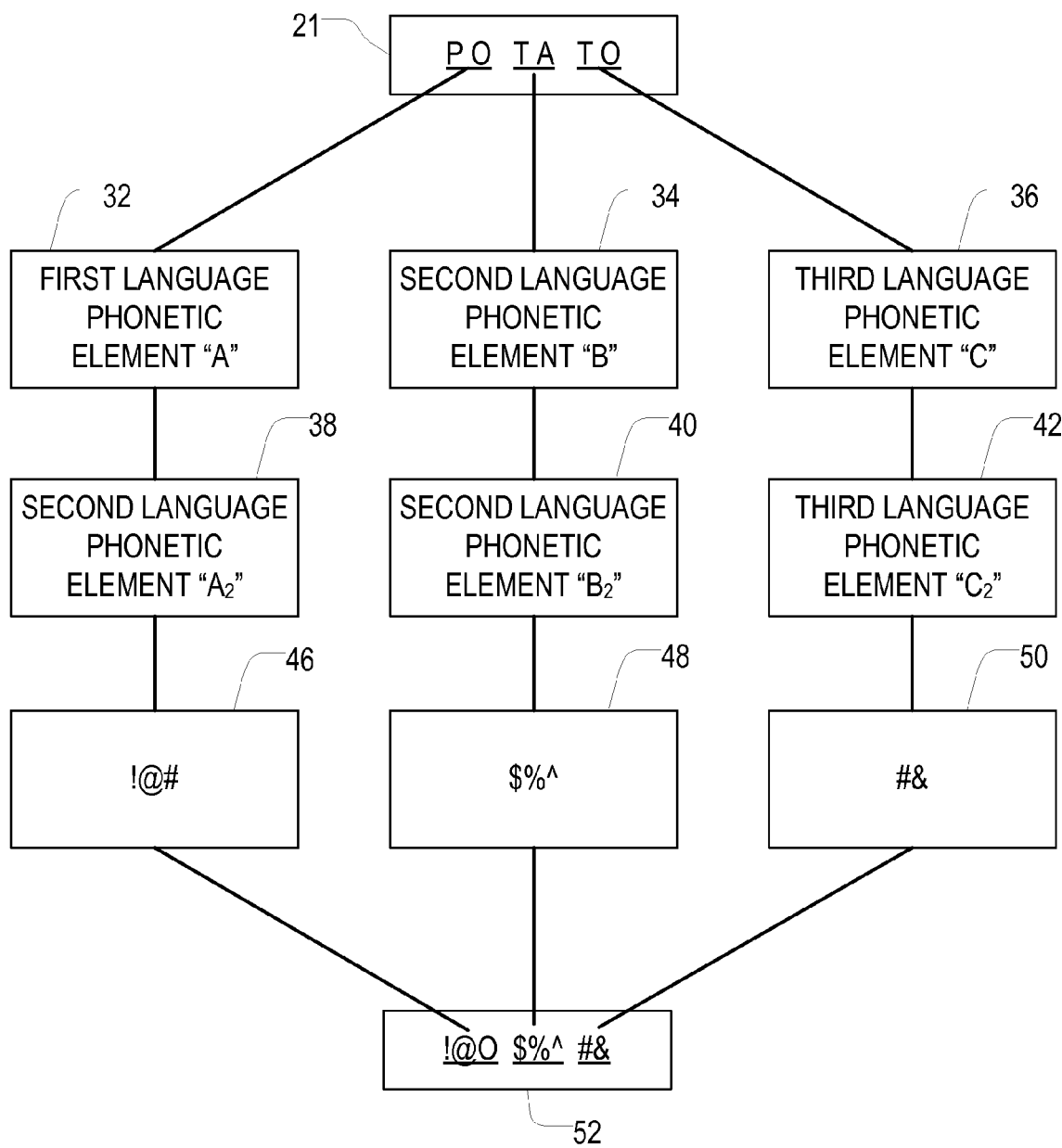
FIG. 3 is a block diagram illustrating intermediate elements when first graphemes shown in FIG. 1 are replaced by associated second graphemes.
Figure 4:
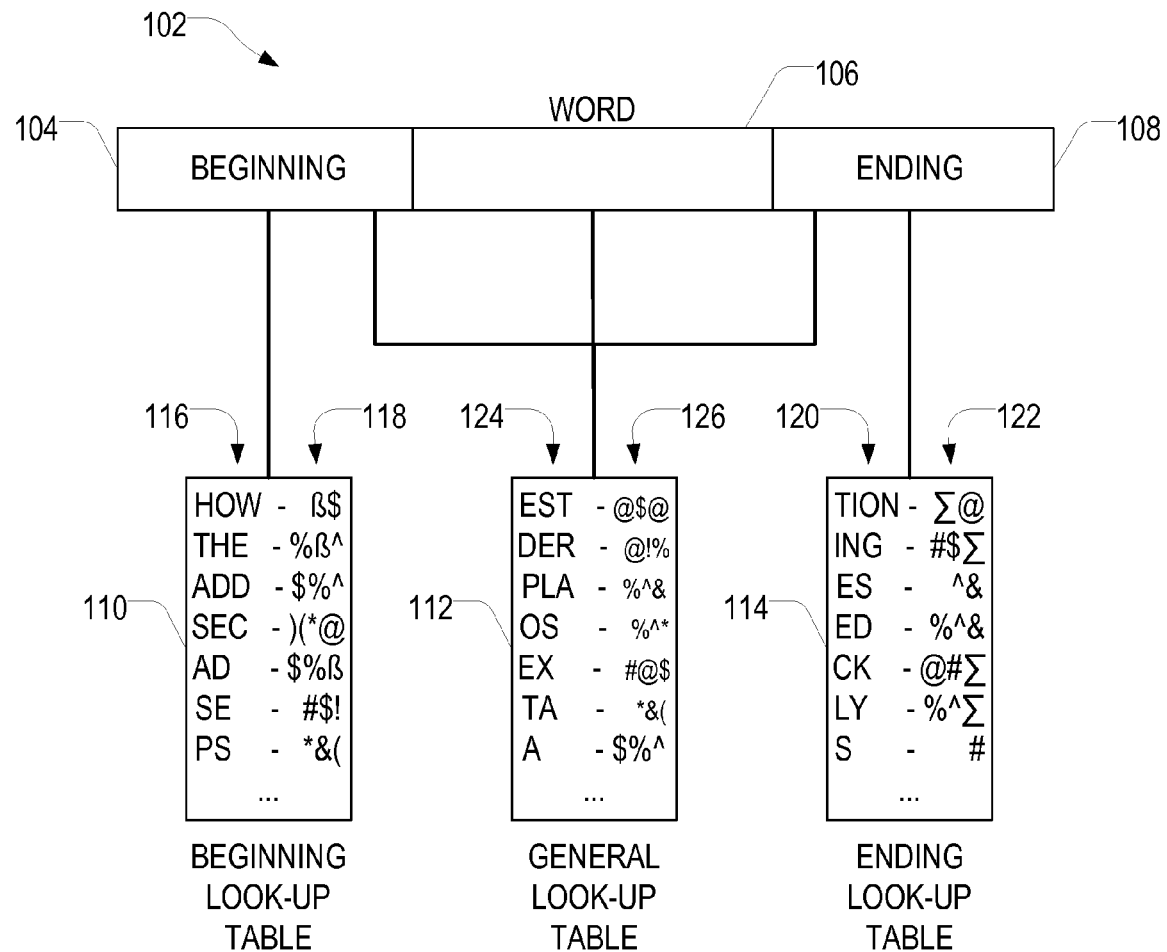
FIG. 4 is an exemplary look-up table that may be referenced by the system shown in FIG. 1 in some embodiments.

Referring now to FIG. 3, illustrated therein are three look-up tables 110, 112, and 114, which may be used for phonetically translating the interface 20 in some embodiments. That is, the processor 12 may be adapted to translate the first graphemes into the second graphemes by referencing the look-up tables 110, 112, and 114 without separately determining the phonetic similarity between the first and second graphemes (since the look-up tables 110, 112, 114 provide a phonetically mapping between the first and second graphemes).

As shown, in some embodiments the look-up tables 110, 112, 114 may be associated with three portions 104, 106, 108 of a given word 102, with each of the look-up tables 110, 112, 114 including first graphemes in the first language and second graphemes in a second language that are associated with the first graphemes based on some degree of phonetic similarity.

In the example shown, the look-up tables 110, 112, 114 include a beginning look-up table 110, an ending look-up table 112, and a remaining look-up table 114. The beginning look-up table 110 includes first graphemes 116 that are generally located at or near the beginning portions of words in the first language. The ending look-up table 112 includes first graphemes 120 that are generally located at or near the ending portions of the words in the first language. The remaining look-up table 112 includes first graphemes 124 that may be located at other locations in the words in the first language (e.g. between the beginning and ending portions of words).

In some embodiments, one or more of the first graphemes or second graphemes (or both) may appear in more than one of the tables 110, 112, 114. Moreover, some of the first graphemes may also have different associated second graphemes in different look-up tables, since it may be possible for a given first grapheme to be vocalized differently depending on where that grapheme is located in a particular word.

As shown, the beginning look-up table 110 includes first graphemes 116 and associated second graphemes 118 (in this embodiment from a fictional language introduced for representative purposes only). Similarly, the ending look-up table 114 includes first graphemes 120 and associated second graphemes 122, and the look-up table 112 includes first graphemes 124 and associated second graphemes 126.

When the word 102 is received (e.g. by the system 10), a first determination may be made as to whether the beginning portion of the word 102 (which in some cases could be the entire word) matches one or more of the first graphemes 116 in the beginning look up table 110. If there is a match, the characters that match are replaced by the associated second graphemes 118.

In some embodiments, the portions of the word 102 with the longest number of corresponding graphemes or characters may be given priority during the search. In such case, if a match is located, the portion of the word 102 with the larger number of characters will be replaced before the portion of the word 102 with the smaller number of characters. This prioritization may provide for more generally more accurate phonetic translation of the word 102. In some cases, to facilitate this prioritization, the beginning look-up table 110 may be organized such that portions with greater numbers of characters are located near the top or the beginning of the look-up table 110.

In some embodiments, the search for matching characters may be performed from the top of the table to the bottom of the table to facilitate prioritization. In some embodiments, the ending look-up table 114 and the general look-up table 112 may be organized in a similar manner for similar reasons.

In some embodiments, once one look-up table has been searched, another look-up table is searched. For instance, if there are any remaining first graphemes that have not been replaced after referencing (i.e. searching and replacing) the beginning table 110, a search and replace operation may performed for the first graphemes in the ending look-up table 114. Similarly, if there are yet other remaining first graphemes that have not been replaced after referencing the beginning and ending look-up tables 110, 114, another search and replace operation is performed using the general look-up table 112.

Generally, the look-up tables 110, 112, 114 may include a sufficient number of first graphemes and associated second graphemes such that after performing searching and replacing as described above using the various look-up tables 110, 112, 114, at least a substantial portion (if not all) of the first graphemes of the given word 102 will have been replaced by phonetically similar second graphemes. As such, the interface 20 will now be displaying the second graphemes (e.g. second graphemes 52) that are phonetically comprehensible in the first language.

In other implementations, it may not be necessary to provide multiple look-up tables 110, 112, 114 associated with various portions of the word 102 (e.g. a single look-up table could be used). However, having multiple different look-up tables 110, 112, 114 associated with the different portions of words as described above may tend to provide a more accurate phonetic translation.

In some embodiments, to translate between two languages, an intermediate language may be used. For example, to translate a software interface in a first language (e.g. Chinese) to a second language (e.g. Hebrew), two sets of look-up tables, namely a first table between the first language (e.g. Chinese) and an intermediate language (e.g. English) and a second table between the intermediate language (e.g. English) and the second language (e.g. Hebrew) may be used. This approach may be advantageous in situations where it may not be convenient to translate directly from the first language to the second language directly. For example, there may not be a direct look-up table between Chinese and Hebrew. However, there may be a look-up table between Chinese and English and another look-up table between English and Hebrew such that both look-up tables could be used to phonetically translate from Chinese to Hebrew.

Figure 5:
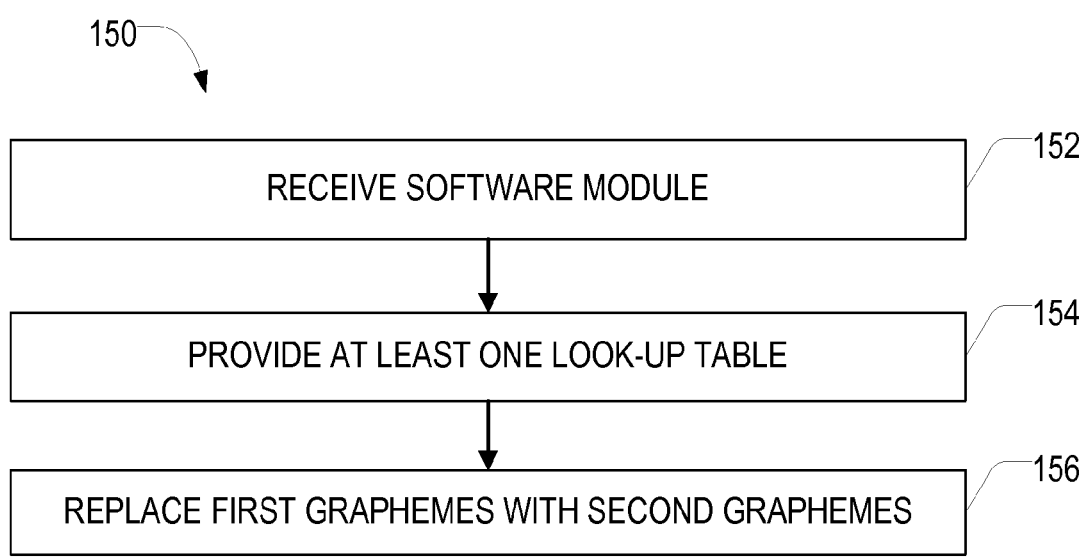
FIG. 5 is a block diagram illustrating some steps of a method for facilitating software interface localization according to another embodiment.

Referring now to FIG. 5, illustrated therein is a method 150 for facilitating software interface localization according to some embodiments. The method 500 may be executed by a testing system (e.g. the testing system 10 described above) to translate the interface 20 to display graphemes of a second language.

At step 152, a software module having an interface (e.g. interface 20) adapted to display a plurality of first graphemes in a first language is received.

At step 154, at least one look-up table having the first graphemes and a plurality of second graphemes in a second language is provided. The first graphemes in the look-up table have at least one associated second grapheme, wherein the association is based on some level of phonetic similarity therebetween. The look-up table may include multiple look-up tables 110, 112, 114 as described above, or a single lookup table.

At step 156, the first graphemes in the interface are replaced with the associated second graphemes. In some embodiments, step 156 may include one or more search methodologies such as the search methodology described above.

After step 156 is executed, the interface will now display the associated second graphemes such that it may possible to determine whether the interface is functional in the second language while still allowing the tester/developer to understand the meaning of the displayed graphemes on the basis of audible similarities.

Figure 6:
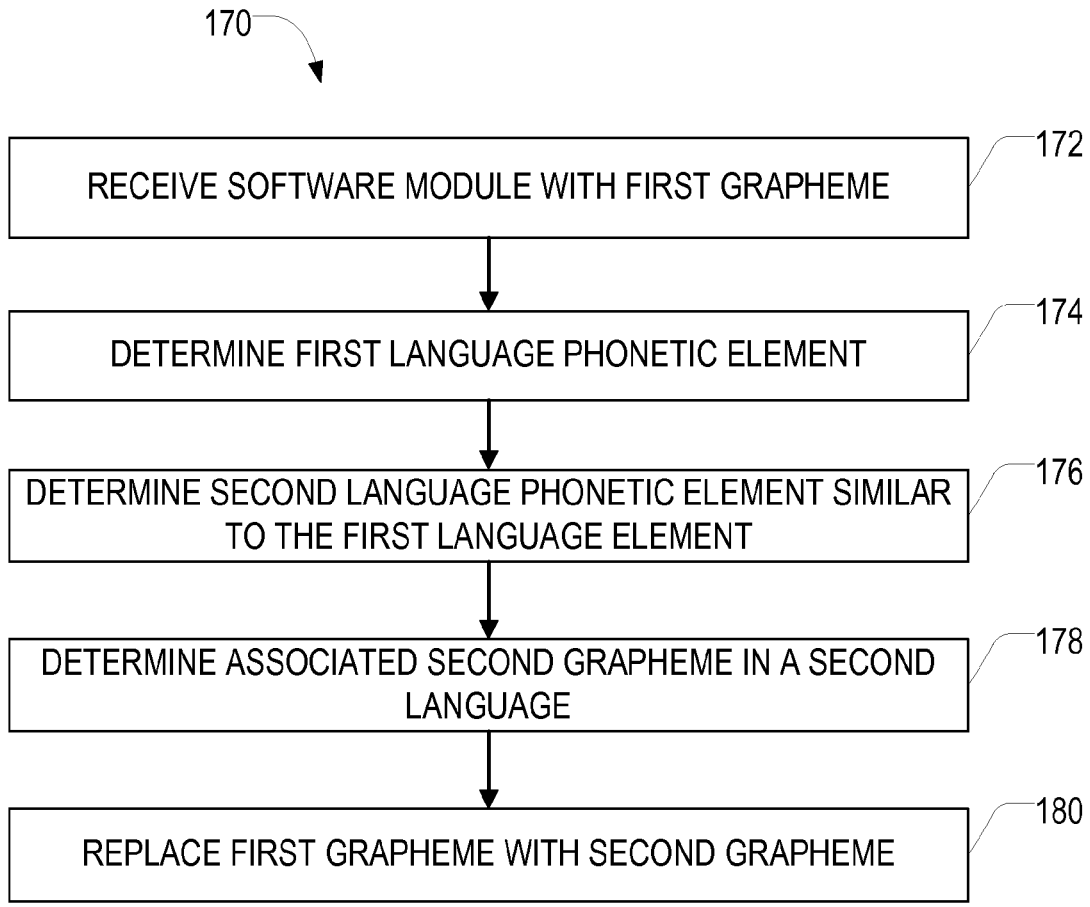
FIG. 6 is a block diagram illustrating some steps of another method for facilitating software interface localization according to yet another embodiment.

Referring now to FIG. 6, illustrated therein is a method 170 for facilitating software interface localization according to another embodiment. The method 170 may be executed by a testing system, for example the testing system 10 described above, to translate the interface (e.g. interface 20) to display graphemes of a second language.

At step 172, a software module having an interface adapted to display a plurality of first graphemes in a first language is received.

At step 174, at least one first language phonetic element associated with at least one of the first graphemes is determined, the phonetic element being a sound associated with the pronunciation of the at least one first grapheme.

At step 176, at least one second language phonetic element that is phonetically similar to the first language phonetic element is determined.

At step 178, at least one second grapheme in a second language associated with the second language phonetic element is determined.

At step 180, the at least one first grapheme of the interface is replaced with the at least one second grapheme so that the received interface displays the second graphemes. In some embodiments, performance of one or more of the steps of the methods 150 or 170 (or both) may be automated.

After step 180 is executed, the given interface will now display the associated second graphemes such that it may be possible for a tester/developer to determine whether the interface is functional in the second language.

In some embodiments, the method 180 may further include the step of recording an association between the at least one first grapheme and the at least one second grapheme to generate a look-up table. For example, the generated look-up table could be similar to the look-up tables 110, 112, 114 described above.

In some embodiments, the methods 150 or 170 (or both) may further comprise the step of testing the interface of the software module displaying the second graphemes to determine whether the interface is functional in the second language.

In some embodiments, the methods 150 or 170 (or both) may further include the step of vocalizing the second graphemes such that the meaning of the second graphemes is comprehensible in the first language.

The embodiments as described herein may entail certain advantages. For example, generally once a look-up table between two languages is provided, that look-up table may be referenced for testing any software between the two languages in the future. Additionally, the look-up tables facilitate automating translating a given software interface from a first language to display graphemes of another language, yet still remaining understandable in the first language.

While the above description provides examples of one or more apparatus, methods, or systems, it will be appreciated that other apparatus, methods, or systems may be within the scope of the present description as interpreted by one of skill in the art.

The invention claimed is:

1. A method for facilitating software interface localization comprising:

receiving a software module to be localized, the software module having a first graphical user interface comprising at least one control label displaying a plurality of first graphemes in a first language, wherein the plurality of first graphemes correspond to text comprising one or more words in the first language;

providing at least one look up table having at least some of the first graphemes and a plurality of second graphemes in a second language associated therewith, said association being based on a phonetic similarly between the first and second graphemes when the first graphemes are vocalized in the first language and the second graphemes are vocalized in the second language; and generating a second graphical user interface of the software module based on the first graphical user interface, including searching the at least one look up table for at least one second grapheme corresponding to at least one of a plurality of portions of the first graphemes, determining a plurality at least a first matching grapheme and a second matching grapheme among the plurality of second graphemes, wherein the first matching grapheme corresponds to a first portion of the plurality of portions of first graphemes, wherein the second matching grapheme corresponds to a second portion of the plurality of portions of first graphemes, wherein the first portion has more text characters than the second portion, and replacing at least one of the first graphemes in the at least one control label of the first graphical user interface with the associated second graphemes such that the second graphical user interface displays the second graphemes in the second language, the second graphemes being understandable in the first language when the second graphemes are vocalized, wherein the replacing of the at least one of the first graphemes comprises determining the first portion has more text characters than the second portion, and replacing the first portion with the first matching grapheme before replacing the second portion with the second matching grapheme based at least in part on a number of text characters comprised in each of the first portion and the second portion.

2. The method of claim 1, further comprising vocalizing the second graphemes such that meaning of the second graphemes are comprehensible in the first language.

3. The method of claim 1, wherein the step of replacing the first graphemes is automated.

4. The method of claim 1, further comprising testing the second graphical user interface to determine whether the second graphical user interface is functional in the second language.

5. The method according to claim 1, wherein the first graphemes are organized as words, each of the words having at least one of a beginning portion, an ending portion and a remaining portion, the beginning portion comprising at least one first grapheme located at the beginning of that word, an ending portion comprising at least one first grapheme located at the end of that word, and a remaining portion comprising at least one first grapheme of that word that are not located at the beginning portion and the end portion.

6. The method according to claim 5, wherein the at least one lookup table comprises at least one of a beginning lookup table having first graphemes that are located in the beginning portion and associated second graphemes, an ending lookup table having first graphemes that are located in the ending portion and associated second graphemes, a general lookup table having first graphemes that are located in any of the beginning portion, ending portion or remaining portion.

7. The method according to claim 6, wherein the first graphemes at the beginning portion of the word are replaced before the first graphemes at the ending portion of the word are replaced.

8. The method according to claim 7, wherein the first graphemes at the ending portion of the word are replaced before the first graphemes at the ending portion of the word are replaced.

9. The method according to claim 1, wherein at least one of the first and second phonetic language elements comprises at least one of a syllable and a phoneme.

10. The method according to claim 1, wherein the step of providing at least one lookup table comprises at least two look up tables, a first lookup table comprising the first graphemes and third graphemes in a third language associated therewith, and a second lookup table comprising the third graphemes and associated third graphemes, and the first graphemes are replaced by the second graphemes based on the first and second lookup tables.

11. The method according to claim 1, wherein at least one of the first graphemes and the second graphemes are Latin based graphemes.

12. The method according to claim 1, wherein at least one of first grapheme and the second graphemes are non-Latin based graphemes.

13. A method for facilitating software interface localization, comprising:
receiving a software module to be localized, the software module having a first graphical user interface comprising at least one control label displaying a plurality of first graphemes in a first language, wherein the plurality of first graphemes correspond to text comprising one or more words in the first language;
determining at least one first language phonetic element associated with at least one of the first graphemes, each phonetic element being a sound associated with the pronunciation of the at least one first grapheme;
determining at least one second language phonetic element that is phonetically similar to the first language phonetic element;
determining at least one second grapheme in a second language associated with the second language phonetic element; and
generating a second graphical user interface of the software module based on the first graphical user interface, including searching for at least one second grapheme corresponding to at least one of a plurality of portions of the first graphemes, determining at least a first matching grapheme and a second matching grapheme among the plurality of second graphemes, wherein the first matching grapheme corresponds to a first portion of the plurality of portions of first graphemes, wherein the second matching grapheme corresponds to a second portion of the plurality of portions of first graphemes, and
replacing the at least one first grapheme in the at least one control label of the first graphical user interface with the at least one second grapheme,
wherein the replacing the at least one first grapheme in the at least one control label of the first graphical user interface with the at least one second grapheme includes determining the first portion has more text characters than the second portion, and replacing the first portion with the first matching grapheme before replacing the second portion with the second matching grapheme based at least in part on a number of text characters comprised in each of the first portion and the second portion.

14. The method of claim 13, further comprising recording the association between the at least one first grapheme and the at least one second grapheme to generate a lookup table.

15. The method of claim 13, further comprising vocalizing the second graphemes such that meaning of the second graphemes are comprehensible in the first language.

16. The method of claim 13, further comprising testing the second graphical user interface of the software module displaying the second graphemes to determine whether the second graphical user interface is functional in the second language.

17. A system for facilitating software interface localization, the system comprising:
a processor;
a data storage device coupled to the processor storing instructions executable by the processor to:
receive a software module to be localized, the software module having a first graphical user interface comprising at least one control label displaying a plurality of first graphemes in a first language, wherein the plurality of first graphemes correspond to text comprising one or more words in the first language;
provide at least one look up table having at least some of the first graphemes and a plurality of second graphemes in a second language associated therewith, said association being based on a phonetic similarly between the first and second graphemes when the first graphemes are vocalized in the first language and the second graphemes are vocalized in the second language; and
generate a second graphical user interface of the software module based on the first graphical user interface, including searching the at least one look up table for at least one second grapheme corresponding to at least one of a plurality of portions of the first graphemes, determining a plurality at least a first matching grapheme and a second matching grapheme among the plurality of second graphemes, wherein the first matching grapheme corresponds to a first portion of the plurality of portions of first graphemes, wherein the second matching grapheme corresponds to a second portion of the plurality of portions of first graphemes, wherein the first portion has more text characters than the second portion, and replacing at least one of the first graphemes in the at least one control label of the first graphical user interface with the associated second graphemes such that the second graphical user interface displays the second graphemes in the second language, the second graphemes being understandable in the first language when the second graphemes are vocalized, wherein the replacing of the at least one of the first graphemes comprises determining the first portion has more text characters than the second portion, and replacing the first portion with the first matching grapheme before replacing the second portion with the second matching grapheme based at least in part on a number of text characters comprised in each of the first portion and the second portion.

18. The system of claim 17, further comprising an audio output device, and the processor is further adapted to vocalize the second graphemes such that meaning of the second graphemes are comprehensible in the first language.

19. The system according to claim 18, wherein the at least one look up table comprises at least one of a beginning lookup table having first graphemes that are located in the beginning portion and associated second graphemes, an ending look up table having first graphemes that are located in the ending portion and associated second graphemes, and a general look up table having first graphemes that are located in any of the beginning portion, ending portion or remaining portion.

20. The system according to claim 18, wherein the one of the first or second graphemes are Latin based graphemes, and the other of the first and second graphemes are non-Latin based graphemes.

21. A method for facilitating software interface localization comprising:
receiving a software module, the software module having an interface adapted to display displaying a plurality of first graphemes in a first language, wherein the plurality of first graphemes correspond to text comprising one or more words in the first language;
providing at least one look up table having at least some of the first graphemes and a plurality of second graphemes in a second language associated therewith, said association being based on a phonetic similarly between the first and second graphemes when the first graphemes are vocalized in the first language and the second graphemes are vocalized in the second language;

searching for at least one second grapheme corresponding to at least one of a plurality of portions of the first graphemes, determining at least a first matching grapheme and a second matching grapheme among the plurality of second graphemes, wherein the first matching grapheme corresponds to a first portion of the plurality of portions of first graphemes, wherein the second matching grapheme corresponds to a second portion of the plurality of portions of first graphemes; and replacing at least one of the first graphemes in the interface with the associated second graphemes such that the interface is adapted to display the second graphemes in the second language, the second graphemes being understandable in the first language when the second graphemes are vocalized, wherein the replacing the at least one first grapheme in the at least one control label of the first graphical user interface with corresponding ones of the second graphemes includes determining the first portion has more text characters than the second portion, and replacing the first portion with the first matching grapheme before replacing the second portion with the second matching grapheme based at least in part on a number of text characters comprised in each of the first portion and the second portion;

wherein the at least one look up table comprises at least two look up tables, a first lookup table comprising the first graphemes and third graphemes in a third language associated therewith, and a second lookup table comprising the third graphemes and associated third graphemes, and the first graphemes are replaced by the second graphemes based on the first and second lookup tables.

* * * * *